United States Patent [19]

Pust

[11] 4,276,836
[45] Jul. 7, 1981

[54] GRAIN DRILL UTILIZING A FERTILIZER SPOUT AND ADJUSTABLE DEFLECTOR THEREFOR

[76] Inventor: Waldo H. Pust, Savage, Mont. 59262

[21] Appl. No.: 89,900

[22] Filed: Oct. 31, 1979

[51] Int. Cl.³ .............................................. A01C 5/08
[52] U.S. Cl. ..................................................... 111/86
[58] Field of Search .................. 111/86, 85, 84, 80, 111/73, 1, 6, 7, 8, 9, 10, 11, 12, 13, 14, 51

[56] References Cited

U.S. PATENT DOCUMENTS

| 555,897 | 3/1896 | Crane | 111/86 |
|---|---|---|---|
| 1,921,886 | 8/1933 | Kriegbaum et al. | 111/85 |
| 3,797,418 | 3/1974 | Bridger | 111/73 |

FOREIGN PATENT DOCUMENTS

| 118811 | 8/1944 | Australia | 111/85 |
|---|---|---|---|
| 119027 | 10/1944 | Australia | 111/86 |
| 153245 | 9/1953 | Australia | 111/86 |

*Primary Examiner*—James R. Feyrer
*Attorney, Agent, or Firm*—Peterson, Palmatier, Sturm & Sjoquist, Ltd.

[57] ABSTRACT

The grain drill includes a furrow opener, a forwardly disposed seed spout, a rearwardly disposed fertilizer spout, and a deflector plate positioned beneath the fertilizer spout so that a desired amount of the fertilizer discharged from the lower end of the fertilizer spout is deflected laterally. The deflector plate is adjustable forwardly and rearwardly with respect to the seed spout so that the amount of fertilizer flowing over the forward edge of the deflector plate can be controlled by the position of the forward edge of the deflector plate with respect to the seed spout.

4 Claims, 5 Drawing Figures

GRAIN DRILL UTILIZING A FERTILIZER SPOUT AND ADJUSTABLE DEFLECTOR THEREFOR

BACKGROUND OF THE INVENTION

1. Field of the Invention

This invention relates generally to grain drills having a forwardly disposed seed spout and a rearwardly disposed fertilizer spout, and pertains more particularly to a means for determining where the fertilizer is deposited in a furrow with respect to the seed.

2. Description of the Prior Art

While a number of grain drills have been marketed without any means for introducing fertilizer into the furrow, a number of fertilizer-grain drills have been employed. Some of these grain drills deposit a mixture of seed and fertilizer through a single tube or spout. Others make use of two tubes or spouts, the seed flowing downwardly through one spout and the fertilizer through the other.

If too much fertilizer is deposited directly onto the seed, then so-called burning can result which interferes with the germination of the seed and also can injure young plants after the seeds have germinated. While various metering devices can control the mixture of seed and fertilizer, this results only in an optimum relation initially and does not provide a latent supply of nutrients that will become available from the fertilizer later on.

SUMMARY OF THE INVENTION

A general object of my invention is to optimumly deposit in a controlled manner fertilizer in a furrow in relation to the seed that has been placed just ahead of the fertilizer depositing.

A more specific object is to apply relatively large amounts of fertilizer without making an extra trip across the field with a fertilizer spreader. In this regard, it is to be noted that farmers are using much more fertilizer than in the past. Accordingly, an aim of the invention is to save time and money by efficiently and effectively depositing the fertilizer with respect to the seed.

A still more specific object of the invention is to deposit large quantities of fertilizer without having the fertilizer go directly onto the seed, yet being close to the seed where the fertilizer is readily available.

Another object, also of a specific character, is to vary the relative amounts of fertilizer that are deposited, allowing some to be deposited directly onto the seed and some to each side. More specifically, an aim of the invention is to not only vary the relative amounts of fertilizer that are deposited onto the seed and to one side thereof, but to permit a facile change of the relative amounts when circumstances so require, such as when soil conditions change or when a different type of seed is to be planted. As a general observation, although an important one, contact of fertilizer with the seed, except when used in small amounts, tends to depress and delay germination, and in some instances even prevent it. Since the trend is to employ larger and larger amounts of fertilizer, my invention overcomes a serious problem as far as controlling the quantity directed onto the seed itself. Still further, my invention permits a distributional adjustment for different fertilizers, the materials contained in commercially available fertilizers obviously not all being the same with some permitting seed contact and others not.

A further object of the invention is to provide a means for optimumly applying fertilizer in a furrow which will be inexpensive to manufacture and which is susceptible for use with various types of furrow openers.

Another object of the invention is to provide an extremely simple device for directionally applying fertilizer to a furrow which can be incorporated onto grain drills already in existence.

Also, my invention has for an object a means for properly applying fertilizer in a furrow which will be rugged and long lasting, requiring little or no maintenance.

Briefly, my invention contemplates the use of separate spouts or tubes for depositing seed and fertilizer in a furrow. The forwardly disposed seed spout is longer and is intended to extend virtually to the bottom of the furrow, whereas the fertilizer spout is shorter. Beneath the lower or discharge end of the fertilizer spout is disposed a deflector plate that can be moved forwardly and rearwardly with respect to the seed spout. When the deflector plate is positioned more rearwardly, then more fertilizer from the fertilizer spout can flow over the leading edge of the deflector plate directly onto the seed deposited via the seed spout and less fertilizer will flow laterally over the side edges of the delfector plate, thus causing relatively less fertilizer to be deposited directly onto the seed. On the other hand, when the deflector plate is positioned forwardly so that its leading edge is virtually in engagement with the seed spout, it follows that virtually no fertilizer will pass over the leading edge of the plate and substantially all of the fertilizer will be directed laterally to each side of the seed row where it is readily available for later use as a nutrient after germination has occurred. Consequently, less fertilizer, or even none, will be deposited directly onto the seed when the plate is adjustably moved to a more forwardly located position than when more rearwardly disposed.

DESCRIPTION OF THE PREFERRED EMBODIMENT

Figure 1:
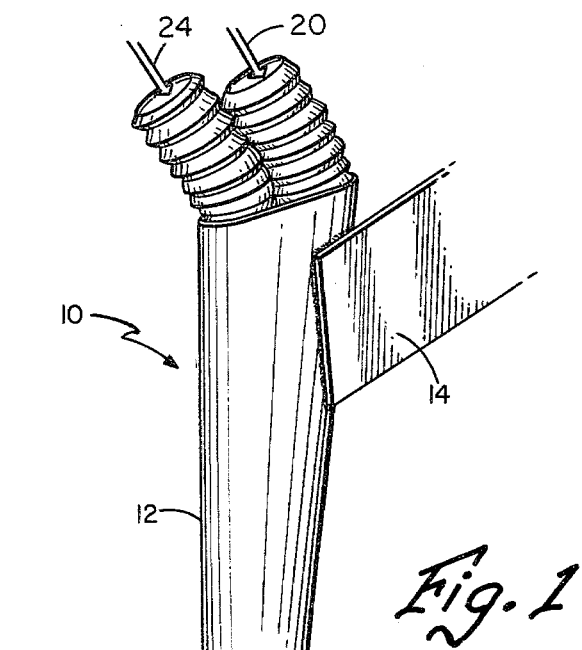
FIG. 1 is a perspective view of a fragmentary portion of a grain drill incorporating my invention therein.

Inasmuch as grain drills are old and well known, the varied constructions thereof playing no real role in the practicing of my invention, it is not believed necessary to show even an exemplary grain drill. However, FIG. 1 does depict a fragmentary portion of a typical grain drill which has been generally labeled 10. It includes a boot 12, braced in part at its upper end by an arm 14 welded thereto, the arm 14 inclining downwardly from a section of the drill's frame (not shown). Attached to the lower end of the boot 12 by a transverse bolt 16 is a hoe-type furrow opener 18, a portion of which has been broken away in order to provide a better understanding of my invention. It will also be understood, especially as the description progresses, that my invention is susceptible to use with types of openers, such as so-called single and double disc ones.

Extending downwardly from the grain or seed box (not shown) of the grain drill is a seed tube 20, terminating in a spout 22. Somewhat similarly, a fertilizer tube 24 extends downwardly from the drill's fertilizer box (also not shown), terminating in a second spout 26. It will be understood that conventional metering devices are employed for controlling the amount of seed delivered via the seed tube 20 and also the amount of fertilizer through the fertilizer tube 24.

At this stage, attention is called to the fact that forwardly disposed seed spout 22 has its lower or discharge end relatively close to the bottom of the furrow labeled 28 in FIG. 1. As best understood from FIG. 4, the fertilizer spout 26 is in direct rearward alignment with the seed spout 22. It can be discerned from FIG. 3 that the fertilizer spout 26 is spaced rearwardly with respect to the seed spout 22. Hence, the seed 30 is deposited in a row centrally within the furrow 28 via the seed spout 22. Also, the laterally separated fertilizer 32a and 32b deposited through the fertilizer spout 26, if my invention were not employed, would be deposited directly onto the seed 30 that has dropped through the seed spout 22.

Inasmuch as too much fertilizer deposited directly on the seed, or at times even a little, can cause burning and interfere with the proper germination of the seed as already mentioned, my invention contemplates the diverting of a desired amount of the fertilizer that would otherwise be deposited directly onto the seed 30, doing so laterally to each side of the row of seed, as indicated by the numerals 32a and 32b. In a further effort to graphically demonstrate what happens, directional arrows 130, 132a and 132b have been applied to FIG. 4, the arrow 130 denoting the direct vertical drop of the seed 30 and the arrows 132a, 132b the directions taken by the fertilizer 32a, 32b. In the first place, too much fertilizer on the seed 30 themselves is obviated, and secondly the amount of fertilizer that is deflected or diverted will function as a deferred or postponed source of nutrients, being made available at a later time when the small plants have matured to the extent that a more continual supply of nutrients is desirable.

Attention is directed at this time to a deflector plate 34. From FIG. 5, it will be perceived that the deflector plate 34 has a portion 34a provided with a curved cross section. The highest or central part of the portion 34a is intended to reside directly beneath the fertilizer spout 26. The plate 34 is also provided with a flat part or shank 34b having an elongated slot 34c formed therein. The deflector plate 34 need not be of heavy gauge sheet metal; it can be sufficiently light and curved slightly via a conventional rolling technique. Actually, it can even be flat sheet metal.

The deflector plate 34 is supported by an L-shaped bracket or strip 36 composed of a generally vertical leg 36a and a horizontal leg 36b. The upper end section of the leg 36a is apertured for the accommodation of a bolt 38, the bolt 38 extending into a threaded hole tapped in the boot 12. The leg 36b is also apertured for the accommodation of a bolt 40, the bolt 40 extending upwardly through the slot 34c and having a nut 42 thereon. It will be appreciated that by loosening the nut 42 the plate 34 can be readily shifted or adjusted forwardly or rearwardly with respect to both spouts 22 and 26.

Having presented the foregoing description, the manner in which my deflector plate 34 functions should be readily understood. However, a brief operational description should serve to demonstrate the benefits that can be derived from a practicing of my invention. Therefore, as the grain drill advances over the field to be planted, whatever number of furrow openers 18 that are present will each form a furrow 28. Considering the furrow 28 formed by the opener 18 depicted in FIG. 1, it will be appreciated that the seeds 30 are gravitationally passed downwardly through the seed tube 20 from the seed box located thereabove, being discharged into the furrow 28 via the spout 22. As already indicated, the seed would be appropriately metered, but since the metering mechanism forms no part of my invention, it is not shown. At any rate, the row of seed 30 that is deposited in the bottom of the furrow 28 is centrally located therein.

If the deflector plate 34 were not present, it would follow that the fertilizer discharged gravitationally down through the fertilizer spout 26, after being appropriately metered as it leaves the fertilizer box thereabove, would be deposited or dropped directly onto the row of seed 30. Although the fertilizer could be metered so as to apply only enough fertilizer in some cases to the seed so that germination would not be interfered with, it still remains that a supply of nutrients for later use after germination would not be available.

Therefore, owing to the fact that the fertilizer spout 26 is rearwardly aligned with respect to the seed spout 22, the mounting of the deflector plate 34 so that the central or highest section of the arcuate portion 34a is directly beneath the lower end of the fertilizer spout 26 will cause the downwardly flowing fertilizer to impinge on the portion 34a of deflector plate 34.

Figure 2:
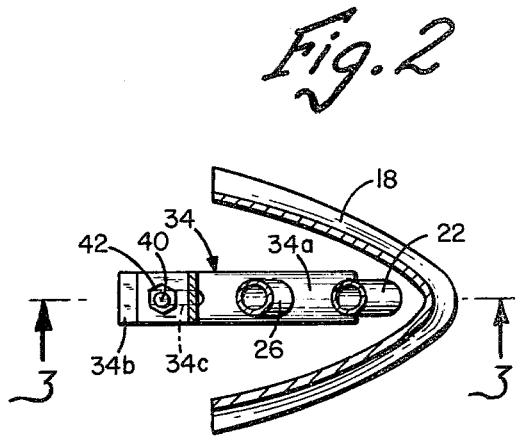
FIG. 2 is a horizontal sectional view taken in the direction of line 2—2 of FIG. 1.
Figure 3:
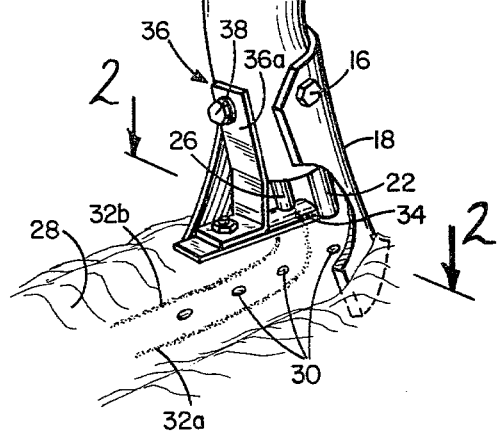
FIG. 3 is a vertical section taken in the direction of line 3—3 of FIG. 2.
Figure 4:
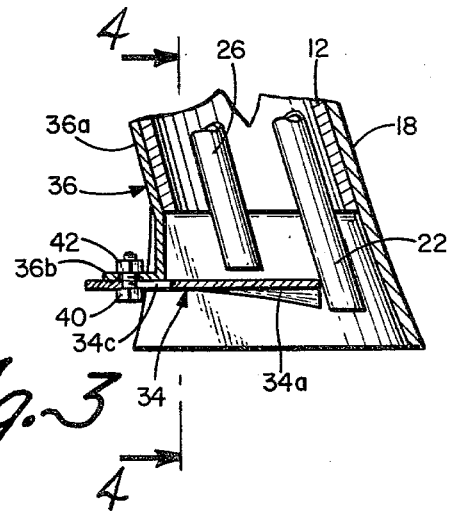
FIG. 4 is a vertical sectional view taken in the direction of line 4—4 of FIG. 3, the view showing the deflector plate in a more forwardly adjusted position.

With the plate 34 forwardly adjusted, as pictured in FIGS. 2 and 3, it can be appreciated that very little, if any, fertilizer will flow over the forward edge thereof. The fertilizer does flow laterally over the side edges of the downwardly curved portion 34a and is deposited to each side of the row of seed 30 formed by the seed spout 22. Consequently, direct contact of the fertilizer with the seed is obviated, yet the deflected fertilizer that resides closer to the sides of the furrow 28 is available for later use by the tender or young plants when the plants need additional fertilization.

Figure 5:
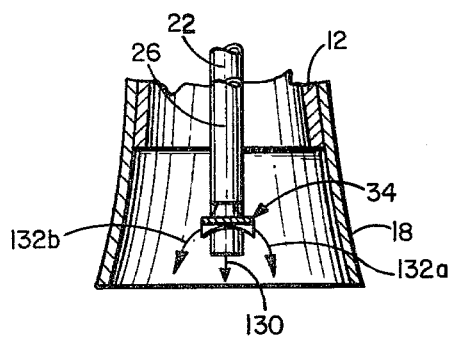
FIG. 5 is a perspective view of the deflector plate showing the slot by reason of which the plate can be adjusted in a fore and aft direction.

On the other hand, if one wishes to allow some of the fertilizer to contact the seed 30, then the deflector plate 34 is adjusted rearwardly into the position shown in FIG. 5. All that is required is that the nut 42 on the bolt 40 be loosed and the plate 34 slid rearwardly, the slot 34a permitting this. In such a rearwardly adjusted position, the forward or leading edge of the deflector plate 34 is spaced behind the seed spout 22 and fertilizer then passes over the forward edge of the portion 34a onto the seed that has been dropped into the furrow 28 via the spout 22. However, depending on the spacing of the plate 34 with respect to the spout 22, some of the fertilizer (and usually most of it) being discharged from the lower end of the fertilizer spout 26 does flow downwardly and laterally over the side edges of the deflector plate 34, then dropping gravitationally to either side of the row of seeds 30 that has been formed by the seed spout 22, forming laterally spaced rows 32a, 32b of fertilizer (but not to the extent or in the amount produced when the plate 34 is fully forward or abutting the spout 22.

Whenever the deflector plate 34 requires adjustment, it will be understood that the farmer need only manually shift the deflector plate 34 either forwardly or rearwardly after first loosening the nut 42. Not only can this be done in order to vary the relative amount of fertilizer that will be introduced into the furrow 28 either onto the seed 30 or to each side thereof, but when different seed is to be planted, then the adjustment can equally be accomplished. The same holds true as far as compensating for different fertilizers which may vary in their composition.

I claim:

1. In a grain drill, a downwardly extending boot, said boot having a forward portion, a furrow opener mounted on the forward portion of said boot, a first spout having an opening at a first predetermined level extending downwardly through said boot for depositing seed into a furrow as the grain drill traverses a field to be planted, a second spout having an opening at a second predetermined level extending downwardly through said boot in rearward spaced alignment with said seed spout for depositing fertilizer into said furrow in a trailing relation with respect to said first spout, said second predetermined level being above said first predetermined level, a deflector plate disposed in a generally horizontal plane between said first and second predetermined levels and extending laterally to each side thereof, and means for adjusting said deflector plate forwardly into contact with said seed spout and rearwardly in said generally horizontal plane out of contact with said seed spout.

2. The combination of claim 1 in which said deflector plate has an arcuate or curved cross section forming side portions sloping downwardly from a location immediately beneath said second spout.

3. The combination of claim 2 in which said plate has an elongated slot formed therein and said adjusting means includes a bracket having a generally vertical leg and a generally horizontal leg integral with the lower end of said vertical leg, said vertical leg being secured to the rear of said boot and projecting beneath the lower end thereof with said horizontal leg extending rearwardly, said horizontal leg having an aperture therein, and a bolt extending through said slot and aperture.

4. The combination of claim 3 in which said furrow opener includes rearwardly diverging sides, said first and second spouts being located between said rearwardly diverging sides.

* * * * *